:::image

:::

US011245467B2

(12) United States Patent
Dankberg

(10) Patent No.: US 11,245,467 B2
(45) Date of Patent: Feb. 8, 2022

(54) SCINTILLATION MITIGATION IN GEOGRAPHICALLY DISTRIBUTED SATELLITE ACCESS NODES

(71) Applicant: VIASAT, INC., Carlsbad, CA (US)

(72) Inventor: Mark Dankberg, Encinitas, CA (US)

(73) Assignee: ViaSat, Inc., Carlsbad, CA (US)

(*) Notice: Subject to any disclaimer, the term of this patent is extended or adjusted under 35 U.S.C. 154(b) by 165 days.

(21) Appl. No.: 16/634,516

(22) PCT Filed: Jan. 25, 2018

(86) PCT No.: PCT/US2018/015238
§ 371 (c)(1),
(2) Date: Jan. 27, 2020

(87) PCT Pub. No.: WO2019/027500
PCT Pub. Date: Feb. 7, 2019

(65) Prior Publication Data
US 2020/0389229 A1    Dec. 10, 2020

Related U.S. Application Data

(60) Provisional application No. 62/539,933, filed on Aug. 1, 2017.

(51) Int. Cl.
*H04B 7/10*      (2017.01)
*G01S 5/02*      (2010.01)
(Continued)

(52) U.S. Cl.
CPC ..... *H04B 7/18513* (2013.01); *H04B 7/18515* (2013.01); *H04B 7/18519* (2013.01); *H04B 7/2041* (2013.01)

(58) Field of Classification Search
CPC .............. H04B 7/2041; H04B 7/18513; H04B 7/18515; H04B 7/18517; H04B 7/18519;
(Continued)

(56) References Cited

U.S. PATENT DOCUMENTS 9,525,477 B1 * 12/2016 Wu .................... H04L 43/16
2010/0150054 A1 * 6/2010 Becker ................ H04L 7/0016
370/316
(Continued)

FOREIGN PATENT DOCUMENTS

CA     2283904 A1    10/1998
CA     2283904 C *    1/2007 ............. G01S 19/44
(Continued)

OTHER PUBLICATIONS

International Search Report and Written Opinion in related PCT/US2018/015238, dated Apr. 9, 2018.
(Continued)

*Primary Examiner* — Edan Orgad
*Assistant Examiner* — Vanneilian Lalchinthang
(74) *Attorney, Agent, or Firm* — Murphy, Bilak & Homiller, PLLC

(57) ABSTRACT

Systems and methods are described for scintillation mitigation in satellite communications systems with geographically distributed access nodes. Some embodiments operate in context of a bent-pipe satellite that illuminates user and gateway coverage areas with fixed spot beams. Beamforming can be used, along with coordinated, phase-synchronized communication by the distributed access nodes, to generate signals that coherently combine via the satellite. Scintillation and/or other atmospheric irregularities can degrade phase synchronization at the access nodes. Accordingly, embodiments can monitor phase tracking performance of the access nodes to detect when a phase tracking error occurs in at least one of the access nodes. In response to detecting the phase tracking error, embodiments can inhibit transmitting of forward uplink data signals by at least that access node.

41 Claims, 4 Drawing Sheets

(51) Int. Cl.
*G01S 19/20* (2010.01)
*H04B 7/185* (2006.01)
*H04B 7/204* (2006.01)

(58) Field of Classification Search
CPC .......... H01Q 1/06; H01Q 1/288; G01S 19/08;
G01S 19/04; G01S 19/11; G01S 19/46;
G01S 19/07; G01S 19/20; G01S 19/071
USPC .......................................................... 370/319
See application file for complete search history.

(56) References Cited

U.S. PATENT DOCUMENTS

2015/0247930 A1* 9/2015 Scheitlin ................. G01S 19/20
342/357.44
2020/0158885 A1* 5/2020 Chen ....................... G01S 19/43

FOREIGN PATENT DOCUMENTS

| EP | 1393470 A1 | 3/2004 | |
|---|---|---|---|
| WO | 2016195813 A2 | 12/2016 | |
| WO | 2016209332 A2 | 12/2016 | |
| WO | WO-2016195813 A2 * | 12/2016 | ......... H04B 7/18517 |
| WO | 2017124004 A1 | 7/2017 | |

OTHER PUBLICATIONS

International Application No. PCT/US2018/015238, International Preliminary Report on Patentability dated Feb. 13, 2020, 7 pages.
Ifiok E. Otung, "Amplitude Scintillation of Ka-Band Satellite Signals," Center for Satellite Engineering Research, University of Surrey, Guildford, Surrey, UK, Aug. 1995, pp. 1-331.
Scott A. Borgsmiller, "Effects of Atmospheric Scintillation in Ka-Band Satellite Communications," Georgia Institute of Technology, Feb. 1998, pp. 1-148.
Nathan Olivarez, "Mitigating the Effects of Ionospheric Scintillation on GPS Carrier Recovery," Worcester Polytechnic Institute, May 2013, pp. 1-121.

* cited by examiner

SCINTILLATION MITIGATION IN GEOGRAPHICALLY DISTRIBUTED SATELLITE ACCESS NODES

FIELD

Embodiments relate generally to satellite communications, and, more particularly, to scintillation mitigation in satellite communications systems having geographically distributed access nodes.

BACKGROUND

A satellite communications system typically includes a satellite (or multiple satellites) that provides connectivity between user terminals and gateway terminals located in coverage areas illuminated by the satellite's beams. The gateway terminals can provide an interface with other networks, such as the Internet or a public switched telephone network. Continuing to satisfy ever-increasing consumer demands for data can involve designing satellite communications systems with higher throughput, more robustness, and more flexibility. For example, gateway outages, weather conditions, changes in demand over time, and other conditions can impact how available satellite resources are translated into provision of communications services over time. Accordingly, fixed satellites designs (e.g., fixed allocation of resources across beams, fixed association between gateways and the user beams they service, fixed signal pathways through the satellite, etc.) can tend to yield inefficient, or otherwise sub-optimal, exploitation of available spectrum and other satellite resources. Some satellite communications systems seek to address some of these considerations by using multiple satellite access nodes (e.g., gateway terminals) that are geographically distributed over the satellite's coverage area. However, reliability of such designs over time can be prone to various atmospheric conditions, such as scintillation.

BRIEF SUMMARY

Among other things, systems and methods are described for scintillation mitigation in satellite communications systems with geographically distributed access nodes. Some embodiments operate in context of a bent-pipe satellite that illuminates user and gateway coverage areas with spot beams. Beamforming can be used, along with coordinated, phase-synchronized communication by the distributed access nodes, to generate signals that coherently combine via the satellite to form desired spot beams. Scintillation and/or other atmospheric irregularities can frustrate maintaining of the phase synchronization at the access nodes. Accordingly, embodiments can monitor phase tracking performance of the access nodes to detect when an insufficiency of the phase stability occurs in at least one of the access nodes. In response to detecting the insufficiency of the phase stability, embodiments can inhibit transmitting of forward uplink data signals by at least that access node.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
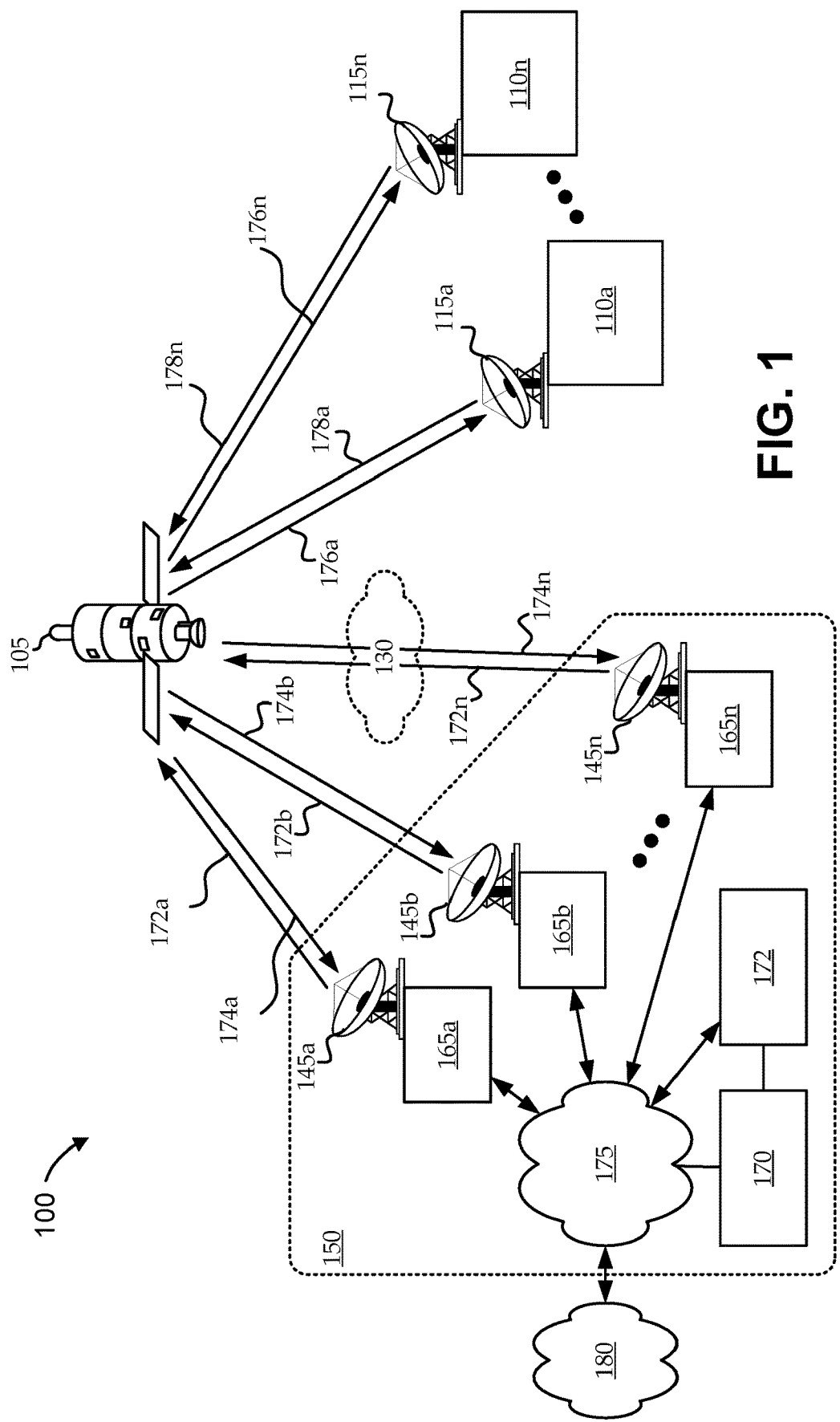
FIG. 1 shows a block diagram of an embodiment of a satellite communications system, according to various embodiments.

Turning first to FIG. 1, a block diagram is shown of an embodiment of a satellite communications system 100, according to various embodiments. The satellite communications system 100 includes a ground segment network 150 in communication with multiple user terminals 110 via a space segment. The space segment can include one or more satellites 105, such as a bent-pipe geostationary (GEO) satellite. The ground segment network 150 can include any suitable number of satellite access nodes (SANs) 165 (e.g., gateway terminals) in communication with the satellite(s) 105. In some embodiments, communications with the satellite are at carrier frequencies above 20 Gigahertz. For example, forward uplink data signals may be transmitted to the satellite using a carrier frequency of at least 25 Gigahertz.

The term "ground" is used herein to generally include portions of the network not in "space." For example, terminals of a ground network can include mobile aircraft terminals, and the like. While user terminals 110 are typically implemented as ground terminals of the satellite communications system 100, they are discussed separately for the sake of clarity. Though not shown, each user terminal 110 can be connected to various consumer premises equipment (CPE) such as computers, local area networks (e.g., including a hub or router), Internet appliances, wireless networks, and the like. In some implementations, user terminals 110 include fixed and mobile user terminals 110.

In the ground segment network 150, the SANs 165 can also be in communication with a distribution network 175. The distribution network 175 generally includes any suitable ground network nodes 170, such as routing nodes, core nodes, network operations centers (NOCs), satellite and gateway terminal command centers. The ground network nodes 170 of the distribution network 175 can provide connectivity with one or more additional networks, such as the Internet 180 or any other suitable type of network infrastructures, such as an IP network, intranet, wide-area network (WAN), local-area network (LAN), virtual private network (VPN), public switched telephone network (PSTN), public land mobile network, etc. The network infrastructures can include various types of connections, like wired, wireless, optical or other types of links. The network infrastructures can also connect ground segment network 150 components (e.g., the ground network nodes 170) to each other and/or with other ground segment networks 150 (e.g., in communication with other satellites).

The SANs 165 of the satellite communications system 100 are geographically distributed. In some embodiments, the distributed SANs 165 enable ground-based beamforming. For example, the ground segment network 150 can include a ground-based beamformer 172 (e.g., a forward-channel beamformer and/or a return-channel beamformer) that can be implemented as one of the ground network nodes 170, in communication with one or more ground network nodes 170, or in any other suitable manner. The beamformer 172 can dynamically apply weights to signals communicated with the distributed SANs 165. The SANs 165 can communicate the beam-weighted signals with the satellite 105 in a coordinated, phase-synchronized manner, such that the signals coherently combine to form user and/or gateway beams. Some such embodiments can enable end-to-end beamforming by applying beam weights that account for end-to-end characteristics of the gateway-to-satellite links, the satellite payload, and the satellite-to-user links. Examples of some end-to-end beamforming approaches are described in PCT Patent Publication No. WO/2016/195813, titled "End-to-end beamforming systems and satellites."

During operation of the satellite communications system 100, various irregularities can occur along the paths the propagating electromagnetic signals follow. Such irregularities can cause phase and/or amplitude variations in signals passing through those irregularities. For example, when a radiofrequency signal (e.g., a satellite signal) passes through a region of the ionosphere having small irregularities in electron density, the signal can experience scattering and fluctuations in refractive index, which can cause phase variations in the plane wave. Similarly, irregularities in the refractive index of the atmosphere (e.g. due to pressure/density, temperature, and other variations) can occur. Scintillation can even occur in interplanetary propagating electromagnetic waves due to variations in the electron density of the solar wind. Fluctuations in phase and/or amplitude resulting from irregularities along the propagation path are referred generally to as "scintillation." A representation of one such irregularity is illustrated as cloud 130, which can potentially cause phase and/or amplitude variations in signals being communicated between the satellite 105 and SAN 165*n*. Such irregularities tend to be relatively localized, such that they only tend to impact communications involving a subset of the SANs 165 (e.g., as illustrated, atmospheric irregularity illustrated as cloud 130 may only impact communications involving SAN 165*n*).

Communications coming from one or more SANs 165 are referred to herein as "forward" or "forward-link" communications, and communications going to one or more SANs (e.g., from user terminals 110) are referred to herein as "return" or "return-link" communications. Communications from the ground (e.g., SANs 165 and user terminals 110) to space (e.g., the satellite 105) are referred to herein as "uplink" communications, and communications to the ground from space are referred to herein as "downlink" communications. The SANs 165 can communicate to the satellite 105 over a forward uplink channel 172 via one or more gateway antennas 145 and can receive communications from the satellite 105 over a return downlink channel 174 via the one or more gateway antennas 145; and the user terminals 110 can communicate to the satellite 105 over a return uplink channel 178 via their user antennas 115 and can receive communications from the satellite 105 over a forward downlink channel 176 via their user antennas 115. In general, scintillation and other similar concerns can affect any radiofrequency communications between the ground and space.

Scintillation is generally greater with higher frequency, and may be of particular concern for systems operating at Ka-band or higher (e.g., V-band). The description herein is focused on the effects of such concerns on communications between the SANs 165 and the satellite 105; namely, communications traversing the forward uplink channels 172 and/or the return downlink channels 174.

Some embodiments of beamforming satellite communications systems 100 rely on maintaining phase synchronization among the distributed SANs 165. As described herein, various phase tracking loops and other synchronization techniques can be used to ensure that signals arrive at the satellite 105 in a desired phase relationship. For example, mutual phase synchronization among the SANs 165 can cause uplink signals to coherently combine at the satellite 105. However, such techniques may not be capable of maintaining phase coherence across the SANs 165 in the presence of scintillation or other environmental conditions. For example, when scintillation causes variations in phase that are too rapid and/or too large, the phase tracking loops may not be capable of maintaining phase lock. A lack of phase coherence across the SANs 165 can cause signals to no longer coherently combine at the satellite 105, thereby degrading beamforming by the satellite communications system 100.

For example, the atmospheric irregularity shown as cloud 130 impacts communications involving SAN 165*n*. In such a case, a particular signal being communicated by SAN 165 likely arrives at the satellite with an incorrect phase and without providing its expected contribution by the particular signal to the beamforming process of the satellite communications system 100. Embodiments described herein, upon detecting such a loss of phase stability, can actively minimize or eliminate the contribution of that particular signal from the beamforming. For example, techniques described herein can inhibit communications of SAN 165*n* by stopping SAN 165*n* from communicating with the satellite 105 (e.g., ceasing transmission of uplink signals from that SAN 165*n*), by reducing beam-weighting of the affected signals (e.g., to a smaller, negligible, or zero beam weight), and/or in other ways.

Determining whether and how to inhibit communications by one or more affected SANs 165 can involve various considerations. For example, while removing negatively contributing signals can have a positive impact on beamforming, appreciably reducing the number of participating distributed SANs 165 can have a negative impact on beamforming (e.g., ground-based beamforming techniques can be improved with larger numbers of participating distributed ground-based terminals). Accordingly, determining when to inhibit the communications from a particular SAN 165 can involve determining when the benefit of removing signals affected by atmospheric irregularities outweighs the cost of reducing the number of SANs 165 contributing to the beamforming. Similarly, after determining to inhibit communications involving one or more affected SANs 165, some embodiments can use various techniques to resume communications involving those SANs 165 when desirable. In one such implementation, the inhibiting of uplink communications by the affected SAN 165n is only for a predetermined amount of time, and those communications are automatically allowed to resume after the predetermined time has elapsed (e.g., after which, if the atmospheric irregularity is still present, communications from the affected SAN(s) 165 may be re-inhibited). Another such implementation can detect (e.g., periodically) whether a previously affected SAN 165 is still being affected by the atmospheric irregularity. For example, though uplink and/or downlink communications involving the affected SAN(s) 165 are inhibited, the affected SAN(s) 165 may still engage in loopback communications, from which it can determine its phase stability as a proxy for determining whether it is being affected by an atmospheric irregularity.

Figure 2:
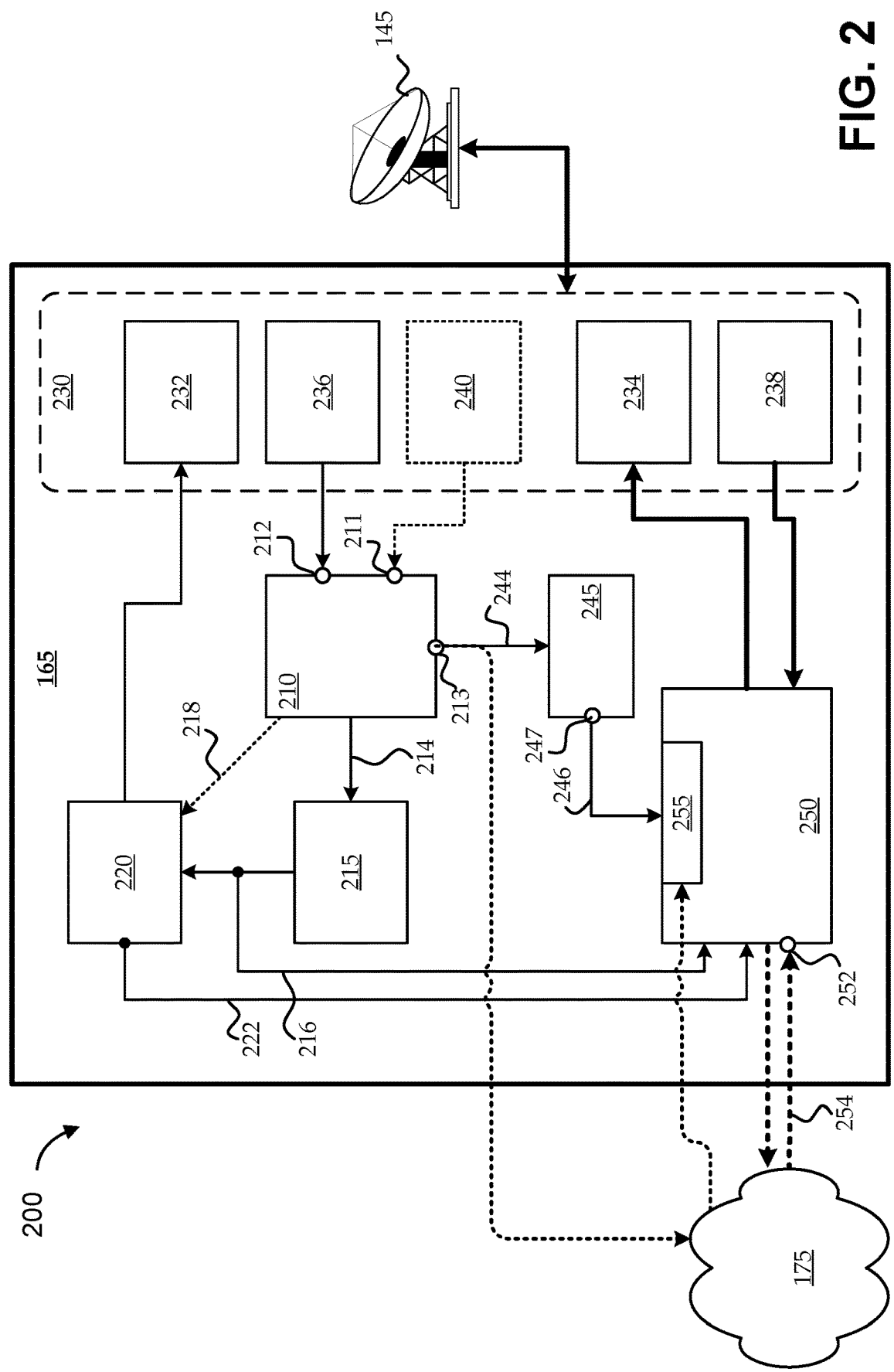
FIG. 2 shows a block diagram of a portion of a ground segment network environment having an illustrative satellite access node (SAN) in communication with a gateway antenna and a distribution network, according to various embodiments.

FIG. 2 shows a block diagram of a partial ground segment network environment 200 having an illustrative satellite access node (SAN) 165 in communication with a gateway antenna 145 and a distribution network 175, according to various embodiments. The SAN 165 can include a transceiver subsystem 230, a phase tracker subsystem 210, and a signal conditioning subsystem 250. Embodiments of the transceiver subsystem 230 are coupled with the gateway antenna 145 to provide communications with one or more satellites. Implementations of the transceiver subsystem 230 can communicate forward-link and return-link traffic, for example, destined for and/or originating at one or more user terminals. As illustrated, the forward-link traffic can be communicated via a forward-link signal transmitter 234, and the return-link traffic can be received via a return-link signal receiver 238. Some implementations of the transceiver subsystem 230 also include a loopback transmitter 232 and a loopback receiver 236. In some implementations, the loopback transmitter 232 can transmit a loopback signal to a bent-pipe satellite, the loopback signal can be relayed by the satellite, and the relayed loopback signal can be received by the SAN 165 via the loopback receiver 236. Some implementations do not include a separate loopback transmitter 232 and loopback receiver 236; rather, the loopback signal is transmitted using the forward-link signal transmitter 234 and received using the return-link signal receiver 238. For example, loopback signals can be pseudo-noise (PN) modulated signals operating in the same bandwidth as the beamformed signals, and the PN modulation can provide spread spectrum processing that avoids the beacon signals from interfering with the beamformed signals. The PN modulation can also provide timing information (e.g., to provide symbol synchronization amongst the SANs 165).

Embodiments of the phase tracker subsystem 210 implement a phase tracking loop that seeks to maintain stable tracking between a phase reference and the phase of satellite communications involving the SAN 165. In some embodiments, the phase tracker subsystem 210 includes a phase reference port 211 to receive a phase reference signal, a loopback port 212 coupled with the transceiver subsystem 230 (e.g., the loopback receiver 236) to receive the loopback signal as received by the SAN 165 from the satellite, and a monitoring port 213 to output a phase tracking stability signal. Embodiments of the phase tracking stability signal indicate a present phase stability of the tracking loop of the SAN 165 according to tracking between the phase reference signal received at the phase reference port 211 and the loopback signal received at the loopback port 212.

The phase reference signal can be generated using various techniques. In some implementations, phase reference information can be derived from a satellite synchronization beacon signal. For example, the transceiver subsystem 230 can include a beacon receiver 240 that receives a synchronization beacon signal from a beacon transmitter on the satellite, and the phase reference generator 215 can be coupled with the phase reference port 211. In one implementation, there is no separate beacon receiver 240, and the synchronization beacon signal is received by the return-link signal receiver 238 (e.g., the synchronization beacon signal is designed to be easily parsed from received return-link traffic). In other implementations, the beacon receiver 240 can receive a master beacon generated by another ground network component, such as by another SAN 165 (e.g., that is pre-designated as a phase master for some or all of the SANs 165). For example, the master beacon can be transmitted by a master SAN 165 to the satellite, relayed by the satellite back to one or more other SANs 165, and received by the other SAN(s) 165 via the respective beacon receiver(s) 240.

Embodiments of the phase tracker subsystem 210 seek to maintain phase stability between the SAN's 165 communications with the satellite and the phase reference. In some implementations, the SAN 165 includes a phase reference generator 215 that generates phase synchronization data 216 internally to the SAN 165. For example, the phase reference generator 215 can include a local oscillator, or the like. Embodiments of the phase tracker subsystem 210 can communicate phase adjustment data 214 to the phase reference generator 215, for example, to adjust the phase synchronization data 216, thereby adjusting the phase of the loopback signal transmitted by the loopback transmitter 232 to bring the relayed loopback signal received by the loopback receiver 236 into alignment with the synchronization beacon signal received by the beacon receiver 240.

In some embodiments, the phase reference generator 215 is coupled with a loopback generator 220, which generates the loopback signal as a function of the phase synchronization data 216 output by the reference generator 215. The output of the loopback generator 220 can be coupled with the loopback transmitter 232 to transmit a generated loopback signal to the satellite. In some embodiments, timing synchronization data 222 (e.g., for time synchronization of SAN 165 communications) can be output by the loopback generator 220. For example, embodiments of the phase tracker subsystem 210 can communicate timing adjustment data 218 to the loopback generator 220 to adjust the timing synchronization data 222 (e.g., to adjust timing of the loopback signal transmitted by the loopback transmitter 232, thereby adjusting timing of the relayed loopback signal received by the loopback receiver 236 into timing alignment with the beacon signal received by the beacon receiver 240.

Embodiments of the signal conditioning subsystem 250 are coupled with the transceiver subsystem 230 and the phase tracker subsystem 210. The signal conditioning subsystem 250 can receive forward-link traffic from one or more ground network nodes 170 of the distribution network 175 and can transmit return-link traffic to one or more ground network nodes 170 of the distribution network 175. In some embodiments, the signal conditioning subsystem 250 includes a forward input port 252 that is coupled with a beamformer (e.g., via one or more nodes of the distribution network 175) to receive forward-link data signals 254 generated in accordance with dynamically computed beamforming weights. As described above with reference to FIG. 1, the SAN 165 can be implemented as one of multiple, geographically distributed SANs 165 operating in a mutually phase-synchronized manner to effect ground-based beamforming. Accordingly, embodiments of the signal conditioning subsystem 250 can seek to output the received, beamformed forward-link data signals 254 to the transceiver subsystem 230, such that the forward-link data signals 254 will be transmitted to the satellite by the transceiver subsystem 230 in a mutual phase-synchronized manner. Realization of mutual phase synchronization by the signal conditioning subsystem 250 can be based on the phase stability maintained by the phase tracker subsystem 210. Accordingly, embodiments of the transceiver subsystem 230 can receive the phase synchronization data 216 (e.g., as output by the phase reference generator 215), and the signal conditioning subsystem 250 can use the phase synchronization data 216 to generate mutually phase-synchronized forward uplink data signals. In some implementations, the multiple SANs 165 are further mutually time-synchronized. In such implementations, the signal conditioning subsystem 250 can receive the timing synchronization data 222 (e.g., as output by the loopback generator 220), and the signal conditioning subsystem 250 can use the timing synchronization data 222 to mutually time-synchronize the forward uplink data signals.

As described above, sufficiently large amounts of scintillation can degrade the ability of the phase tracker subsystem 210 to maintain phase stability. For example, where the SAN 165 is in communication with a GEO satellite, there is approximately a quarter-second round-trip delay between transmitting the loopback signal and receiving the relayed loopback signal. Such a delay can limit the ability of the phase tracking loop to handle high-rate variations in phase (e.g., as might occur with scintillation), and phase variations that occur at a rate outside the tracking bandwidth of the phase tracking loop may not be removed by the phase tracking loop. In such cases, the absolute phase error, and the time-averaged or filtered phase error, can be large. Embodiments can detect phase stability insufficiencies (i.e., an inability of the phase tracker subsystem 210 to maintain sufficient phase stability for mutual phase synchronization of its forward uplink data signals), and can inhibit transmission of its forward uplink data signals, accordingly. As illustrated, embodiments of the SAN 165 include a phase error detector 245 coupled with the phase tracker subsystem 210 to receive a phase stability signal 244. The phase stability signal 244 indicates a present phase stability of the tracking loop maintained by the phase tracker subsystem 210 (i.e., between the phase reference signal received at the phase reference port 211 and the loopback signal received at the loopback port 212). The phase error detector 245 also includes a trigger port 247 to output an inhibit signal 246 in response to detecting the phase stability insufficiency according to the phase stability signal 244. Embodiments of the signal conditioning subsystem 250 can include an inhibitor 255 that is coupled with the trigger port 247 to autonomously cease transmission of the forward uplink data signals in response to the inhibit signal 246.

The phase stability signal 244 can be generated in various ways by the phase tracker subsystem 210. In some embodiments, the phase stability signal 244 is generated by the phase tracker subsystem 210 as a function of a lock state of the phase tracking loop. For example, the phase tracker subsystem 210 can monitor the phase tracking loop to detect whether the loop is in lock or out of lock, and the phase stability insufficiency is detected in response to the lock state indicating the phase tracking loop is out of lock. In some embodiments, the phase tracker subsystem 210 includes a phase-locked loop (PLL) that takes the phase reference signal and the relayed loopback signal as its inputs. The PLL can be designed to have an output that reliably indicates whether the PLL is in a locked state. In one implementation, the PLL outputs an error voltage that is a function of its phase stability, such that, when phase stability is maintained (i.e., when the PLL is in a locked state), a steady state error voltage is produced. For example, the phase error detector 245 can generate the inhibit signal 246 in response to detecting that the error voltage has moved away from steady state by a certain magnitude.

In other embodiments, the phase stability signal 244 is generated by the phase tracker subsystem 210 as a function of measuring a phase error in the phase tracking loop (e.g., a phase difference between the relayed loopback signal and the phase reference signal). Alternatively, embodiments can estimate a loop tracking error variance of the phase tracking loop. For example, as the relayed loopback signal varies in phase from the phase reference signal, a loop tracking error can be monitored (e.g., an error voltage generated by the phase tracker subsystem 210); and the phase stability signal 244 can indicate that loop tracking error, or a measure of variance of that loop tracking error over time. A measured phase error, or a variance of the loop tracking error, in excess of a predetermined tolerance level (e.g., an error voltage margin) can indicate the phase stability insufficiency. For example, the phase error detector 245 can generate the inhibit signal 246 in response to detecting that the measured phase error or the variance of the loop tracking error is in excess of the predetermined tolerance level.

In other embodiments, the phase tracker subsystem 210 is designed to output an indication of loop tracking quality as the phase stability signal 244. Some implementations can measure loop tracking quality effectively as a corollary to measuring phase error or loop tracking error variance. For example, an increase in phase error or loop tracking error variance can indicate a decrease in loop tracking quality. Accordingly, in such embodiments, the phase stability insufficiency can be detected in response to the loop tracking quality being below a predetermined threshold. In one implementation, a comparator compares periodic samples of an error voltage over time to a threshold voltage level, and the output of the comparator is coupled with a counter circuit. The counter circuit tallies the number of times the sampled error voltage exceeds the threshold voltage level over a sampling window and outputs a difference between the tally and a predefined threshold maximum. For example, a higher tally results in a lower difference, thereby indicating a lower loop tracking quality. In such an implementation, the phase error detector 245 can generate the inhibit signal 246 in response to detecting that the counter output has fallen below a particular level.

Various embodiments of the signal conditioning subsystem 250 can inhibit communications of forward uplink data signals in various ways. In some embodiments, the inhibitor 255 receives the inhibit signal 246 from the phase error detector 245 and autonomously ceases its transmission of forward uplink data signals. Some such embodiments are completely autonomous, such that the rest of the network continues to operate without knowledge of the SAN's 165 inhibiting of its communications. For example, the beamformer, or other components of the ground network, may detect that the SAN 165 has ceased transmitting forward uplink data signals, and may cease generating signals for that SAN 165, may adjust beamforming weights to reduce or remove the SAN 165 contribution to beamforming, and/or otherwise respond to the detecting. In other such embodiments, the signal conditioning subsystem 250 (or any suitable component of the SAN 165) can inform nodes of the distribution network 175 that it is ceasing communications of forward uplink data signals, so that the network can stop generating signals for that SAN 165. For example, some implementations can achieve sufficient beamforming benefit by removing the affected signals from the satellite uplink; while other implementations can achieve further beamforming benefit by removing the affected SANs 165 from scheduling and beamforming computations.

In other embodiments, the inhibiting involves further involvement from one or more nodes of, or in communication with, the distribution network 175. In such embodiments, the SAN 165 communicates the phase stability signal 244 to a ground network node 170 in, or via, the distribution network 175, and the ground network node 170 can make the inhibit determination (e.g., the ground network node 170 can determine, according to the phase stability signal 244, whether there is an insufficiency of phase stability). For example, the phase error detector 245 may be implemented in the ground network node 170, instead of being in each SAN 165. In some such embodiments, the SAN 165 (e.g., the inhibitor 255 of the signal conditioning subsystem 250) can receive the inhibit signal 246 from the distribution network 175 and can autonomously cease transmission of the forward uplink data signals in response thereto. In other such embodiments, the phase stability signal 244 is used (directly by the beamformer, or by another ground network node 170 to direct the beamformer) to adjust beamforming weights in response to detecting a phase stability insufficiency. For example, the beamformer can dynamically re-compute beamforming weights to remove beamforming contributions by the affected forward uplink data signals from the SAN 165 in response to detecting the phase stability insufficiency. Similarly, the beamformer can adjust beamforming weights to remove beamforming contributions by the affected return downlink signals from the SAN in response to detecting the phase stability insufficiency. Removing the beamforming contributions can involve reducing the applicable beam weights to zero, or substantially to zero; for example a beam weight of zero for a particular SAN effectively ceases transmission of the forward uplink data signals by that particular SAN. In some alternative implementations, the inhibit signal 246 can be communicated to the distribution network instead of, or in addition to, communicating the phase stability signal 244. For example, the phase error detector 245 in the SAN 165 can output the inhibit signal 246 in response to detecting the phase stability insufficiency; the beamformer can receive the inhibit signal 246; and the beamformer can adjust beamforming weights, as appropriate to effectively cease transmission of the forward uplink data signals by the SAN 165.

Figure 3:
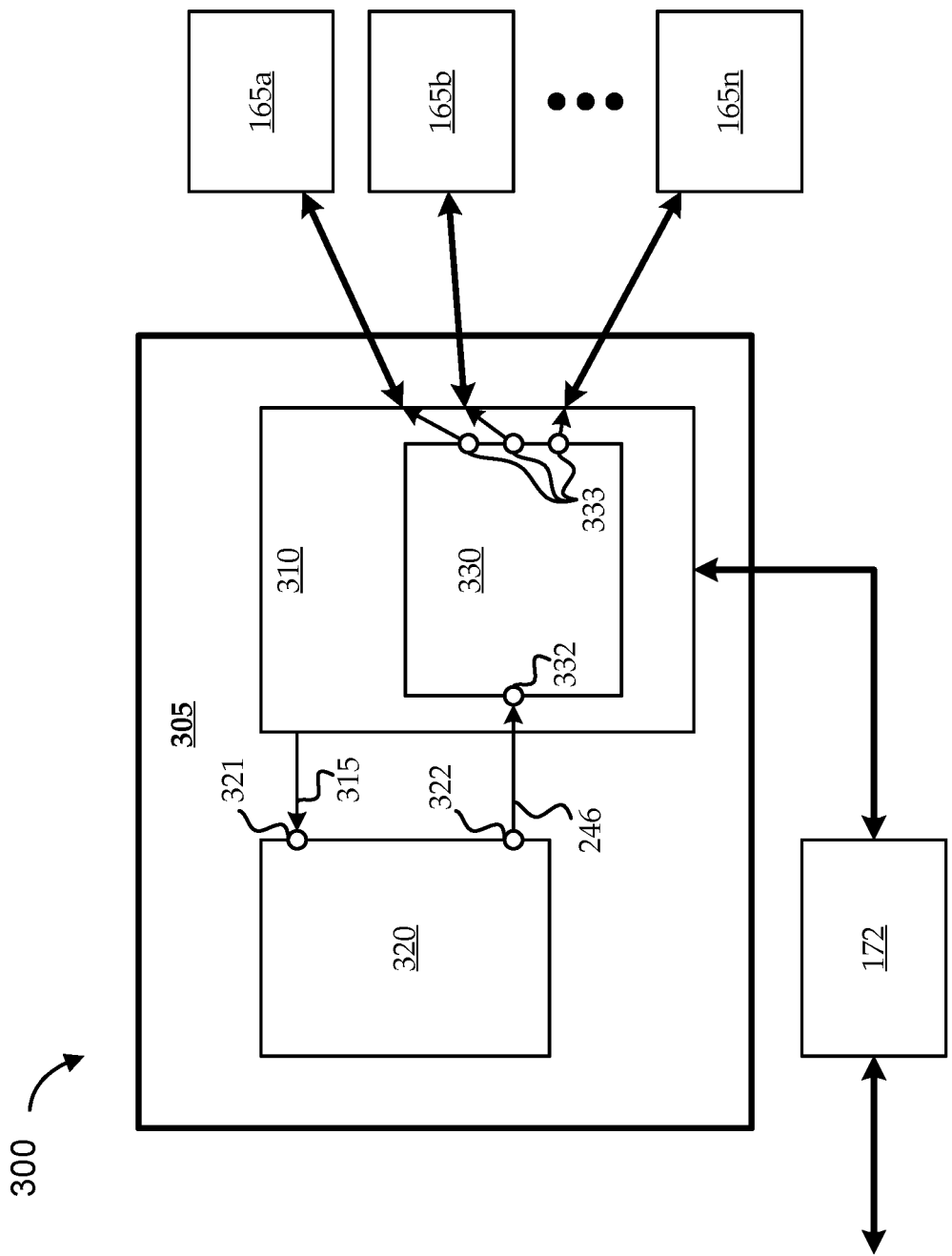
FIG. 3 shows a block diagram of another portion of a ground segment network environment having an illustrative ground network node in communication with multiple SANs and with a beamformer, according to various embodiments.

FIG. 3 shows a block diagram of another partial ground segment network environment 300 having an illustrative ground network node 305 (on example of a ground network node 170 of FIG. 2) in communication with multiple SANs 165 and with a beamformer 172, according to various embodiments. Though not shown, the ground network node 170 can part of a distribution network 175 that provides connectivity with the multiple SANs 165, or the ground network node 170 can be in communication with the SANs 165 via such a distribution network 175. Further, though shown as a separate component, the beamformer 172 can be implemented as part of the ground network node 170. The ground segment network environment 300 can enable additional embodiments for performing functionality described above with reference to FIGS. 1 and 2.

As illustrated, the ground network node 170 can include a SAN tracker subsystem 320 and a communications system 310. The SAN tracker subsystem 320 can include a SAN input port 321 to receive, from each of the multiple SANs 165, a respective SAN tracking signal 315 that corresponds to a present phase stability of a tracking loop of the SAN 165 between a respective phase reference signal of the SAN 165 and a respective loopback signal of the SAN 165. For example, as described with reference to FIG. 2, each SAN 165 can output a phase stability signal 244 indicating a present phase stability of the SAN's 165 phase tracker subsystem 210; and each SAN tracking signal 315 can correspond to a respective phase stability signal 244. Alternatively, the SAN tracking signals 315 can be derived from one or more of the phase stability signals 244 (e.g., using aggregate data from multiple of the phase stability signals 244 to detect trends, anomalies, etc.). The SAN tracking signals 315 can be received directly, or via the communications system 310.

The SAN tracker subsystem 320 can also include a tracking output port 322 to transmit an inhibit signal 246 associated with at least one of the SANs 165 in response to detecting that the at least one SAN 165 is presently manifesting a phase stability insufficiency according to the SAN tracking signals. The inhibit signal 246 can be generated by the SAN tracker subsystem 320 using the techniques described with reference to the phase error detector 245 of FIG. 2. For example, the SAN tracker subsystem 320 can determine that one or more of the SAN tracking signals 315 indicates, for the corresponding SANs' 165 phase tracking loops, a lock state that is out of lock, an estimated loop tracking error variance that is outside of a predetermined tolerance level, a phase error that is outside of a predetermined tolerance level, a loop tracking quality that is below a predetermined threshold, etc. In some embodiments, one or more of the SAN tracking signals 315 can include an inhibit signal 246 generated by a phase error detector 245 of a corresponding SAN 165, such that determination of phase stability insufficiency is made by each SAN 165, and not by the ground network node 170.

Embodiments of the communications system 310 include a forward communications subsystem 330. The forward communications subsystem 330 can include a tracking input port 332 coupled with the tracking output port 322 to receive the inhibit signal 246. The forward communications subsystem 330 can also include multiple forward signal output ports 333, each to communicate respective forward signals to respective ones of the SANs 165. As described above, the forward signals are generated in accordance with dynamically computed beamforming weights (e.g., applied by the beamformer 172), and transmission of the respective forward signals by the at least one SAN 165 is inhibited in accordance with the inhibit signal 246. In some embodiments, the inhibiting involves the forward communications subsystem 330 communicating the inhibit signal 246 to the affected SAN(s) 165, such that transmission of the respective forward signals by the affected SAN(s) 165 is inhibited in accordance with the inhibit signal 246. For example, each affected SAN 165 receives the inhibit signal 246, and its inhibitor 255 ceases transmission of its forward uplink data signals. In other embodiments, the forward communications subsystem 330 determines not to send the forward signals to the affected SANs 165 in accordance with the inhibit signals 246, thereby effectively ceasing transmission of the signals by the affected SANs 165. In other embodiments, in accordance with the inhibit signals 246, the ground network node 170 can direct the beamformer 172 to adjust appropriate beamforming weights to remove beamforming contributions by transmissions involving the affected SANs 165; thereby effectively inhibiting transmission of the respective forward signals by the affected SANs 165.

In some embodiments, the ground network node 170 can perform different or additional functionality by aggregating phase stability information from multiple of the SANs 165. According to some such embodiments, the SAN tracker subsystem 320 can use the SAN tracking signals 315 to determine respective insufficiency magnitudes for the SANs 165. Each insufficiency magnitude can be an absolute magnitude, a relative magnitude, or any suitable measure of the relative phase stability of one SAN 165 as compared to that of some or all of the other SANs 165. For example, the SAN tracker subsystem 320 can evaluate SAN tracking signals 315 for N of the SANs 165 (N is a positive integer greater than two, and less than or equal to the total number of SANs 165 in communication with the ground network node 170) to identify M of the N SANs as having highest respective insufficiency magnitudes (M is a positive integer less than N). The inhibit signal(s) 246 can be generated to inhibit communications of forward uplink data signals by the identified M SANs 165.

Though some embodiments of FIGS. 2 and 3 are described with a focus on forward-link traffic (e.g., forward uplink data signals), embodiments can apply similar techniques in the return-link direction. For example, in some ground-based beamforming architectures, return-link traffic is received as downlink signals by the SANs 165. The received return-link traffic can be synchronized and beam-weighted to effectively beamform the received signals retroactively. In some embodiments, the signal conditioning subsystem 250 of the SANs 165 (e.g., shown in FIG. 2) can perform mutual phase- and/or time-synchronization of the received signals as a function of the phase adjustment data 216 and/or the timing adjustment data 222. The mutually synchronized signals can be communicated, via the distribution network 175, to a beamformer 172 (e.g., to a return beamforming subsystem of beamformer 172), which can apply return beam weights to the signals to retroactively effect the return-link beamforming. Further, techniques similar to those described for forward-link implementations above can be used to inhibit contributions of the return-link traffic from the beamforming when a phase stability insufficiency is detected. For example, the inhibiting can be performed explicitly (e.g., by the signal conditioning subsystem 250 of a particular SAN 165 not passing its received signals to the beamformer 172) and/or implicitly (e.g., by using the beamformer 172 to weight the signals in such a way that effectively removes their contribution to the beamforming after being received via the distribution network 175.

Figure 4:
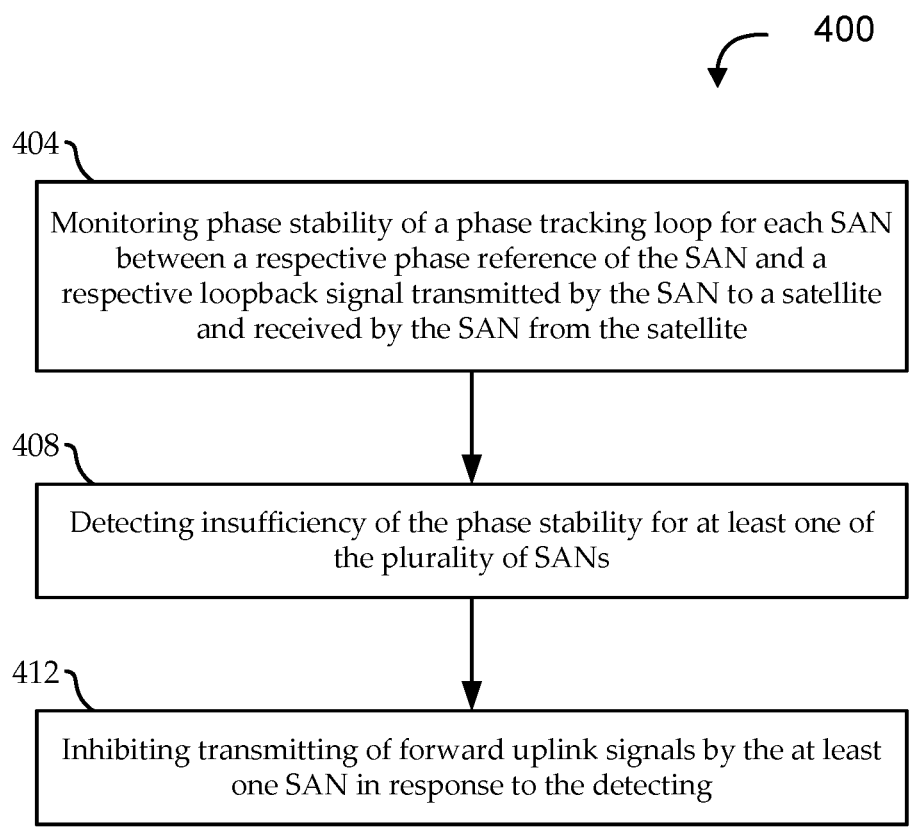
FIG. 4 shows a flow diagram of an illustrative method for managing synchronization error in a beamforming satellite communications system, according to various embodiments.

FIG. 4 shows a flow diagram of an illustrative method 400 for managing synchronization error in a beamforming satellite communications system, according to various embodiments. The method 400 operates in context of a beamforming satellite communications system having multiple SANs that transmit forward uplink data signals to a satellite (e.g., a bent-pipe GEO satellite) in a mutually phase-synchronized manner in reliance on phase tracking. In such a context, the forward uplink data signals are generated in accordance with dynamically computed beamforming weights. Embodiments of the method 400 begin at stage 404 by monitoring phase stability of a phase tracking loop for each SAN between a respective phase reference of the SAN and a respective loopback signal transmitted by the SAN to a satellite and received by the SAN from the satellite.

Embodiments continue at stage 408 by detecting insufficiency of the phase stability for at least one of the plurality of SANs. As described above, the monitoring at stage 404 and the detecting at stage 408 can be performed in various ways. In some embodiments, the monitoring at stage 404 can involve monitoring a lock state of the phase tracking loop, and the detecting at stage 408 can involve detecting that the lock state indicates the phase tracking loop is out of lock. In other embodiments, the monitoring at stage 404 can involve estimating a loop tracking error variance of the phase tracking loop, and the detecting at stage 408 can involve detecting that the loop tracking error variance is outside of a predetermined tolerance level. In still other embodiments, the monitoring at stage 404 can involve monitoring a phase error of the phase tracking loop, and the detecting at stage 408 can involve detecting that the phase error is outside of a predetermined tolerance level. In other embodiments, the monitoring at stage 404 can involve monitoring a loop tracking quality of the phase tracking loop, and the detecting at stage 408 can involve detecting that the loop tracking quality is below a predetermined threshold.

Embodiments continue at stage 412 by inhibiting transmitting of forward uplink data signals by the at least one SAN in response to the detecting. Different stages of the method 400 can be performed using the SANs and/or the ground network nodes to enable different embodiments. In some embodiments, each SAN monitors its phase stability at stage 404, at least one SAN detects the insufficiency at stage 408 in response to its monitoring, and the at least one SAN autonomously performs the inhibiting at stage 412 by ceasing its transmitting of forward uplink data signals. In other embodiments, each SAN monitors its phase stability at stage 404 and produces monitoring data, the detecting at stage 408 is performed by a ground network node in response to receiving monitoring data from the SANs, and the inhibiting at stage 412 involves the ground network node directing at least one affected SAN to cease its transmitting forward uplink data signals in response to receiving the monitoring data. In some such embodiments, the monitoring data output by the SANs can include a tracking error signal generated by the SAN in response to detecting insufficiency of its own phase stability, and the inhibiting at stage 412 can involve directing the at least one affected SAN according to the tracking error signal. In some alternative embodiments, each SAN monitors its phase stability at stage 404, and the detecting at stage 408 is performed either by the SAN or by the ground network node (e.g., from received monitoring data); but the inhibiting at stage 412 involves directing the ground-based beamformer to adjust beamforming weights to remove beamforming contributions by transmissions involving the at least one affected SAN. In still other embodiments, the monitoring at stage 404 can be by the ground network node, for example, by receiving phase stability from the respective phase tracking loops of the SANs. In such embodiments, the inhibiting at stage 412 can involve the ground network node directing the affected at least one SAN to cease its transmitting of forward uplink data signals and/or directing the beamformer to adjust the beamforming weights to remove beamforming contributions by transmissions involving the at least one SAN.

Some embodiments perform the method 400 on a SAN by SAN basis, while others can use aggregate phase stability information to perform the method 400 at the network level. For example, the detecting at stage 408 can involve the ground network node detecting a respective insufficiency magnitude for each of N SANs and identifying M of the N SANs as having highest respective insufficiency magnitudes. In such cases, the inhibiting at stage 412 can involve the ground network node directing ceasing transmitting of the forward uplink data signals by the M identified SANs in response to the detecting (e.g., explicitly by directing inhibitors at those SANs and/or implicitly by adjusting appropriate beamforming weights).

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Features implementing functions can also be physically located at various positions, including being distributed such that portions of functions are implemented at different physical locations. As used herein, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

What is claimed is:

1. A beamforming satellite communications system, the system comprising:
a satellite access node (SAN) comprising:
a transceiver subsystem to transmit a loopback signal to a bent-pipe satellite and to receive the loopback signal from the satellite in response thereto, and to transmit forward uplink data signals to the satellite;
a phase tracker subsystem and having:
a phase reference port to receive a phase reference signal;
a loopback port coupled with the transceiver subsystem to receive the loopback signal as received from the satellite; and
a monitoring port to output a phase stability signal that indicates a present phase stability of a tracking loop of the SAN between the phase reference signal received at the phase reference port and the loopback signal received at the loopback port; and
a signal conditioning subsystem coupled with the transceiver subsystem and the phase tracker subsystem and having:
a forward input port to receive forward signals from a ground network, the forward signals generated in accordance with dynamically computed beamforming weights; and
a forward output port to transmit the forward uplink data signals to the transceiver subsystem, the forward uplink data signals generated from the forward signals to be transmitted in a phase-synchronized manner in accordance with the phase stability signal, such that transmission of the forward uplink data signals is inhibited in response to detecting a phase stability insufficiency in the phase stability signal.

2. The system of claim 1, wherein:
the SAN further comprises a phase error detector coupled with the phase tracker subsystem to receive the phase stability signal, the phase error detector having a trigger port to output an inhibit signal in response to detecting the phase stability insufficiency; and
the signal conditioning subsystem further comprises an inhibitor coupled with the trigger port to autonomously cease transmission of the forward uplink data signals in response to the inhibit signal.

3. The system of claim 1, wherein:
the phase stability signal is generated by the phase tracker subsystem as a function of a lock state of the phase tracking loop; and
the phase stability insufficiency is detected in response to the lock state indicating the phase tracking loop is out of lock.

4. The system of claim 1, wherein:
the phase stability signal is generated by the phase tracker subsystem as a function of estimating a loop tracking error variance of the phase tracking loop; and
the phase stability insufficiency is detected in response to the loop tracking error variance being outside of a predetermined tolerance level.

5. The system of claim 1, wherein:
the phase stability signal is generated by the phase tracker subsystem as a function of a phase error of the phase tracking loop; and the phase stability insufficiency is detected in response to the phase error being outside of a predetermined tolerance level.

6. The system of claim 1, wherein:
the phase stability signal is generated by the phase tracker subsystem as a function of a loop tracking quality of the phase tracking loop; and
the phase stability insufficiency is detected in response to the loop tracking quality being below a predetermined threshold.

7. The system of claim 1, wherein:
the signal conditioning subsystem further comprises an inhibitor coupled with the ground network to autonomously cease transmission of the forward uplink data signals in response to receiving an inhibit signal from the ground network, the inhibit signal generated by the ground network in response to detecting the phase stability insufficiency by the ground network.

8. The system of claim 1, wherein:
the forward signals are generated by the ground network in accordance with the dynamically computed beamforming weights to remove beamforming contributions by the forward uplink data signals from the SAN in response to the ground network detecting the phase stability insufficiency, thereby ceasing transmission of the forward uplink data signals by the SAN.

9. The system of claim 1, wherein:
the SAN is one of a plurality of geographically distributed SANs of the beamforming satellite communications system; and
each SAN generates respective forward uplink data signals to be transmitted in a phase-synchronized manner in accordance with a respective phase tracking signal, such that the plurality of forward uplink data signals are transmitted in a mutually phase-synchronized manner to coherently combine at the satellite.

10. The system of claim 1, wherein:
the phase tracker subsystem further comprises a phase-lock loop (PLL) having PLL inputs to receive the phase reference signal and the loopback signal; and
the phase stability insufficiency is detected when an output of the PLL manifests an out-of-tolerance variance over time.

11. The system of claim 1, wherein the SAN further comprises:
a phase reference generator to generate the phase reference signal from the loopback signal as transmitted to the satellite.

12. The system of claim 1, wherein the SAN further comprises:
a phase reference generator to generate the phase reference signal from a synchronization beacon signal received via the transceiver subsystem from the satellite.

13. The system of claim 1, further comprising:
the ground network, communicatively coupled with a plurality of SANs, the SAN being one of the plurality of SANs.

14. The system of claim 1, further comprising:
the bent-pipe satellite in communication with the SAN.

15. A beamforming satellite communications system, the system comprising:
a ground network node comprising:
a SAN tracker subsystem having:
a satellite access node (SAN) input port to receive, from each of the plurality of SANs, a respective SAN tracking signal that corresponds to a present phase stability of a tracking loop of the SAN between a respective phase reference signal of the SAN and a respective loopback signal of the SAN; and
a tracking output port to transmit an inhibit signal associated with at least one of the plurality of SANs in response to detecting that the at least one SAN is presently manifesting a phase stability insufficiency according to the SAN tracking signals; and
a forward communications subsystem having:
a tracking input port coupled with the tracking output port to receive the inhibit signal; and
a plurality of forward signal output ports, each to communicate to a respective one of the plurality of SANs respective forward signals generated in accordance with dynamically computed beamforming weights and the inhibit signal, such that transmission of the respective forward signals by the at least one SAN is inhibited in accordance with the inhibit signal.

16. The system of claim 15, wherein:
each SAN tracking signal is a phase stability signal generated by a respective SAN to indicate the present phase stability of the SAN; and
the inhibit signal is generated, at the SAN tracker subsystem, by detecting, for each SAN, whether the SAN is manifesting the phase stability insufficiency according to the phase stability signal generated by the SAN.

17. The system of claim 15, wherein:
the SAN tracking signal for each SAN comprises the inhibit signal, the inhibit signal generated by the SAN to directly indicate whether the SAN is manifesting the phase stability insufficiency.

18. The system of claim 15, wherein:
the present phase stability of each SAN is a function of a lock state of the phase tracking loop of the SAN; and
the at least one SAN is presently manifesting a phase stability insufficiency when the lock state indicates the phase tracking loop is out of lock.

19. The system of claim 15, wherein:
the present phase stability of each SAN is a function of an estimated loop tracking error variance of the phase tracking loop; and
the at least one SAN is presently manifesting a phase stability insufficiency when the loop tracking error variance is outside of a predetermined tolerance level.

20. The system of claim 15, wherein:
the present phase stability of each SAN is a function of a phase error of the phase tracking loop; and
the at least one SAN is presently manifesting a phase stability insufficiency when the phase error is outside of a predetermined tolerance level.

21. The system of claim 15, wherein:
the present phase stability of each SAN is a function of a loop tracking quality of the phase tracking loop; and
the at least one SAN is presently manifesting a phase stability insufficiency when the loop tracking quality being below a predetermined threshold.

22. The system of claim 15, further comprising:
a beamformer to dynamically compute the beamforming weights,
wherein the ground network node is in communication with the beamformer to direct the beamformer to adjust the beamforming weights to remove beamforming contributions by transmissions involving the at least one SAN in accordance with the inhibit signal, such that transmission of the respective forward signals by the at least one SAN is inhibited in accordance with the inhibit signal.

23. The system of claim 15, further comprising:
wherein the forward communications subsystem is further to communicate the inhibit signal to the at least one SAN, such that transmission of the respective forward signals by the at least one SAN is inhibited in accordance with the inhibit signal.

24. The system of claim 15, further comprising:
the plurality of SANs, each in communication with the forward communications subsystem to receive the forward signals, each SAN comprising a transceiver subsystem to communicate forward uplink data signals to a satellite, the forward uplink data signals generated from the forward signals to be communicated by the plurality of SANs in a mutually phase synchronized manner.

25. A method for managing synchronization error in a beamforming satellite communications system having a plurality of satellite access nodes (SANs) that transmit forward uplink data signals to a satellite in a mutually phase-synchronized manner in reliance on a respective phase tracking loop of each SAN, the forward uplink data signals generated in accordance with dynamically computed beamforming weights, the method comprising:
monitoring phase stability of the phase tracking loop for each SAN between a respective phase reference of the SAN and a respective loopback signal transmitted by the SAN to the satellite and received by the SAN from the satellite;
detecting insufficiency of the phase stability for at least one of the plurality of SANs; and
inhibiting transmitting of forward uplink data signals by the at least one SAN in response to the detecting.

26. The method of claim 25, wherein:
the forward uplink data signals are transmitted in a phase-synchronized manner by each SAN according to an output of a PLL disposed in the SAN and having, as inputs to the PLL, the respective phase reference of the SAN and the respective loopback signal of the SAN as received from the satellite by the SAN;
monitoring the phase stability comprises tracking the output of the PLL over a time window; and
detecting the insufficiency of the phase stability comprises detecting an out-of-tolerance variance in the output over the time window.

27. The method of claim 25, wherein:
monitoring the phase stability comprises monitoring a lock state of the phase tracking loop; and
detecting the insufficiency of the phase stability comprises detecting that the lock state indicates the phase tracking loop is out of lock.

28. The method of claim 25, wherein:
monitoring the phase stability comprises estimating a loop tracking error variance of the phase tracking loop; and
detecting the insufficiency of the phase stability comprises detecting that the loop tracking error variance is outside of a predetermined tolerance level.

29. The method of claim 25, wherein:
monitoring the phase stability comprises monitoring a phase error of the phase tracking loop; and
detecting the insufficiency of the phase stability comprises detecting that the phase error is outside of a predetermined tolerance level.

30. The method of claim 25, wherein:
monitoring the phase stability comprises monitoring a loop tracking quality of the phase tracking loop; and
detecting the insufficiency of the phase stability comprises detecting that the loop tracking quality is below a predetermined threshold.

31. The method of claim 25, wherein:
the detecting comprises detecting, by a ground network node, a respective insufficiency magnitude for each of N SANs and identifying M of the N SANs as having highest respective insufficiency magnitudes, M and N being positive integers, and M being less than N; and
the inhibiting comprises directing, by the ground network node, the M SANs to cease transmitting forward uplink data signals in response to the detecting.

32. The method of claim 25, wherein:
the monitoring comprises each SAN monitoring its phase stability;
the detecting comprises the at least one SAN detecting the insufficiency in response to the monitoring by the at least one SAN; and
the inhibiting comprises the at least one SAN autonomously ceasing its transmitting forward uplink data signals in response to the detecting.

33. The method of claim 25, wherein:
the monitoring comprises each SAN outputting respective monitoring data indicating its phase stability;
the detecting comprises receiving the respective monitoring data by a ground network node from the at least one SAN; and
the inhibiting comprises directing, by the ground network node, the at least one SAN to cease its transmitting forward uplink data signals in response to the receiving by the ground network node.

34. The method of claim 25, wherein:
the monitoring comprises each SAN monitoring its phase stability;
the detecting comprises the at least one SAN detecting the insufficiency in response to the monitoring by the at least one SAN, and the at least one SAN generating a tracking error signal in response to the detecting that indicates the insufficiency for the SAN; and
the inhibiting comprises receiving the tracking error signal by a ground network node and directing, by the ground network node, the at least one SAN to cease its transmitting forward uplink data signals in response to the receiving.

35. The method of claim 25, wherein:
the monitoring comprises each SAN outputting respective monitoring data indicating its phase stability;
the detecting comprises receiving the respective monitoring data by a ground network node from the at least one SAN;
the beamforming weights are dynamically computed by a ground-based beamformer in communication with the ground network node; and
the inhibiting comprises directing the ground-based beamformer to adjust the beamforming weights to remove beamforming contributions by transmissions involving the at least one SAN.

36. The method of claim 25, wherein:
the monitoring is by a ground network node in communication with the plurality of SANs; and
the inhibiting comprises directing, by the ground network node, the at least one SAN to cease its transmitting forward uplink data signals in response to the monitoring by the ground network node.

37. The method of claim 25, wherein:
the monitoring is by a ground network node in communication with the plurality of SANS;
the beamforming weights are dynamically computed by a ground-based beamformer in communication with the ground network node; and
the inhibiting comprises directing the ground-based beamformer to adjust the beamforming weights to remove beamforming contributions by transmissions involving the at least one SAN.

38. The method of claim 25, further comprising:
detecting, subsequent to the inhibiting, a return to sufficiency of the phase stability for at least one of the plurality of SANs according to the monitoring; and
un-inhibiting the transmitting of forward uplink data signals by the at least one SAN in response to detecting the return to sufficiency.

39. The method of claim 25, wherein the respective phase reference of each SAN is derived from the loopback signal of the SAN as transmitted to the satellite.

40. The method of claim 25, wherein the respective phase reference of each SAN is derived from a synchronization beacon signal received by each SAN from the satellite.

41. The method of claim 25, wherein:
the plurality of SANs comprises a phase-master SAN; and
the respective phase reference of each of a subset of the plurality of SANs is derived from a synchronization signal received by each of the subset of the plurality of SANs from the phase-master SAN.

\* \* \* \* \*